US007800263B2

(12) United States Patent
Horng et al.

(10) Patent No.: US 7,800,263 B2

(45) Date of Patent: Sep. 21, 2010

(54) HEAT DISSIPATING FAN

(75) Inventors: Alex Horng, Kaohsiung (TW); Tso-Kuo Yin, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 317 days.

(21) Appl. No.: 12/035,498

(22) Filed: Feb. 22, 2008

(65) Prior Publication Data

US 2009/0189492 A1 Jul. 30, 2009

(30) Foreign Application Priority Data

Jan. 28, 2008 (TW) .............................. 97103137 A

(51) Int. Cl.
*H02K 7/00* (2006.01)
*H02K 11/00* (2006.01)

(52) U.S. Cl. .................... 310/67 R; 310/49.01; 310/58; 310/68 R; 310/89; 310/90

(58) Field of Classification Search ................... 310/48, 310/58, 67 R, 68 R, 89, 156, 49.01, 90; *H02K 7/00, H02K 11/00*
See application file for complete search history.

(56) References Cited

U.S. PATENT DOCUMENTS 5,932,943 A * 8/1999 Werner et al. ............. 310/67 A
7,332,842 B2 * 2/2008 Kasahara et al. .............. 310/84
2002/0024264 A1 * 2/2002 Matsumoto ............... 310/68 R
2004/0256933 A1 * 12/2004 Toyokawa et al. ............. 310/89
2005/0057105 A1 * 3/2005 Kasahara .................. 310/49 R
2005/0058559 A1 * 3/2005 Kasahara et al. ......... 417/423.7
2006/0220474 A1 10/2006 Yoshida
2006/0220475 A1 * 10/2006 Goto et al. ................ 310/49 R
2007/0114860 A1 * 5/2007 Chen et al. ................ 310/67 R
2007/0126306 A1 * 6/2007 Wu et al. .................... 310/179
2007/0273227 A1 * 11/2007 Lan et al. ....................... 310/89
2008/0024023 A1 * 1/2008 Jiang et al. .................... 310/89

FOREIGN PATENT DOCUMENTS

TW 200744290 1/2006

* cited by examiner

*Primary Examiner*—Quyen Leung
*Assistant Examiner*—John K Kim
(74) *Attorney, Agent, or Firm*—Alan Kamrath; Kamrath & Associates PA

(57) ABSTRACT

A heat dissipating fan includes a fan housing having an outer frame portion. An air inlet and an air outlet are respectively defined in two ends of the outer frame portion. A hollow motor casing is formed in and integral with the outer frame portion. An inner-rotor-type motor is mounted in the motor casing and includes a rotor and a stator. The rotor is rotatably received in the stator and includes a shaft and a magnetic element. The shaft extends beyond the motor casing. The magnetic element is coupled with the shaft and faces the stator. At least one impeller is coupled to the shaft and located outside the motor casing. A circuit board is electrically connected to the stator.

9 Claims, 7 Drawing Sheets

1 15 31 3 111 11 123 A 121 211 123 22 2 12 21 212 14 124, 222 163 112 13 122 18 164 17 161 4 164 162

HEAT DISSIPATING FAN

BACKGROUND OF THE INVENTION

1. Field of the Invention

The present invention relates to a heat dissipating fan and, more particularly, to a heat dissipating fan including a motor having an inner rotor.

2. Description of Related Art

FIG. 1 shows a conventional heat dissipating fan including an outer-rotor-type motor. Specifically, the heat dissipating fan includes a frame 51, a stator 52, a circuit board 53, and a rotor 54. An axle tube 511 is formed in the frame 51 and receives at least one bearing 512. The stator 52 and the circuit board 53 are mounted around the axle tube 511, with the stator 52 electrically connected to the circuit board 53. The rotor 54 includes a shaft 541 and an impeller 542 mounted to an end of the shaft 541. The shaft 541 is extended into the axle tube 511 and rotatably held by the bearings 512. The impeller 542 includes a permanent magnet 543 facing the stator 52. The circuit board 53 controls the stator 52 and the permanent magnet 543 to proceed with energizing for creating an alternating magnetic field to drive the impeller 542 to rotate for heat dissipation purposes.

Motors of an outer rotor type are generally less stable in rotation than those of an inner rotor type. Currently existing heat dissipating fans often utilize outer-rotor-type motors as a driving device for dissipating heat in various electronic products. The current trend of research and development of electronic products includes high speed, function integrity, and miniaturization, which also have increased need for heat dissipation. Unfortunately, the conventional heat dissipating fans having outer-rotor-type motors can not fulfill the heat dissipation need of these electronic products.

To meet higher heat dissipating need, heat dissipating fans having inner-rotor-type rotors are utilized, and an example of which is disclosed in Taiwan Patent Publication No. 200744290 entitled "FAN AND ITS INNER-ROTOR-TYPE MOTOR." As illustrated in FIG. 2, the conventional inner-rotor-type motor includes a housing 61, a stator 62, a rotor 63, and a driving device 64. The housing 61 is comprised of a first housing 611 and a second housing 612. The stator 62 includes a magnetically conductive member 621 to which the driving device 64 is electrically connected. The rotor 63 includes a shaft 631 extending through the housing 61 and a magnetic element 632 mounted around the shaft 631 and facing the magnetically conductive member 621. The driving device 64 controls the current direction of the magnetically conductive member 621 to cooperate with the magnetic element 632 for generating an alternating magnetic field to drive the rotor 63 to rotate. An impeller 65 can be coupled to the shaft 631 to form a fan. However, the housing 61 must be mounted inside a fan housing (not shown) when it is desired to dissipate heat in various electronic products with such a fan. Air current generated by rotation of the impeller 65 can be guided to a heat-generating portion in an electronic product for heat dissipating purposes. However, mounting of the conventional heat dissipating fan having an inner-rotor-type motor in the fan housing is troublesome. Furthermore, the driving device 64 (i.e., the circuit board) is mounted at a location near the stator 62 that generates a large amount of heat during operation. As a result, damage to electronic elements is liable to occur, for heat dissipation of the driving device 64 is not easy.

SUMMARY OF THE INVENTION

The primary object of the present invention is to provide a heat dissipating fan including a fan housing receiving an inner-rotor-type motor to provide enhanced rotational stability and enhanced heat dissipating effect.

Another object of the present invention is to provide a heat dissipating fan including a fan housing that has an integrally formed motor casing receiving an inner-rotor-type motor to provide enhanced assembling convenience.

A further object of the present invention is to provide a heat dissipating fan including a circuit board and a stator spaced from the circuit board to prevent the heat dissipating effect of the circuit board from being adversely affected by the large amount of heat resulting from operation of the stator.

A heat dissipating fan according to the preferred teachings of the present invention includes a fan housing having an outer frame portion. An air inlet and an air outlet are respectively defined in two ends of the outer frame portion. A hollow motor casing is formed in and integral with the outer frame portion. An inner-rotor-type motor is mounted in the motor casing and includes a rotor and a stator. The rotor is rotatably received in the stator and includes a shaft and a magnetic element. The shaft extends beyond the motor casing. The magnetic element is coupled with the shaft and faces the stator. At least one impeller is coupled to the shaft and located outside the motor casing. A circuit board is electrically connected to the stator.

At least one connecting member is interconnected between the motor casing and the outer frame portion and defines a passageway between the motor casing and the outer frame portion. The motor casing and the outer frame portion can be interconnected by a plurality of fixed blades.

The motor casing includes a first positioning portion on an outer peripheral wall thereof, and the stator includes a second positioning portion coupled with the first positioning portion.

In an embodiment, the motor casing includes first and second openings respectively in two ends thereof. A positioning member is mounted in the second opening and includes a plurality of fixing portions fixing the circuit board. The circuit board and the stator are spaced from each other by the positioning member. The first opening of the motor casing includes a chamber receiving a first bearing. The positioning member includes a compartment receiving a second bearing and a through-hole in communication with the compartment. An end of the shaft is extended through the first opening and rotatably coupled with the first bearing. The other end of the shaft is extended through the through-hole and rotatably coupled with the second bearing. An impeller is coupled to the end of the shaft extending beyond the first opening. A resilient element is mounted between the impeller and the first bearing.

In another embodiment, the motor casing includes first and second openings respectively in two ends thereof. A positioning member is mounted in the first opening and includes a plurality of third openings. The stator includes a plurality of positioning posts on an end thereof. The positioning posts extend through the third openings to fix the circuit board. The circuit board and the stator are spaced from each other by the positioning member. The positioning member further includes a compartment receiving a first bearing and a through-hole in communication with the compartment. The second opening of the motor casing includes a chamber receiving a second bearing. An end of the shaft extends through the through-hole and rotatably coupled with the first bearing. The other end of the shaft extends through the second opening and is rotatably coupled with the second bearing. Two impellers are respectively coupled to two ends of the shaft extending beyond the first and second openings. A resilient element is mounted between the first bearing and one of the two impellers.

The heat dissipating fans according to the preferred teachings utilizes inner-rotor-type motors that rotate stably to enhance the overall heat dissipating effect of the heat dissipating fans. Furthermore, the heat dissipating fans according to the preferred teachings of the present invention utilizes a fan housing having an integral motor casing for receiving an inner-rotor-type motor to provide more convenient assembly than conventional heat dissipating fans utilizing inner-rotor-type motors. Further, since the circuit board and the stator are spaced apart from each other by the partitioning member, the heat dissipating effect of the circuit board is prevented from being adversely affected by the large amount of heat resulting from operation of the stator. Thus, damage to the associated electronic elements can be avoided.

Other objects, advantages and novel features of this invention will become more apparent from the following detailed description when taken in conjunction with the accompanying drawings.

DETAILED DESCRIPTION OF THE PREFERRED EMBODIMENTS

Figure 1:
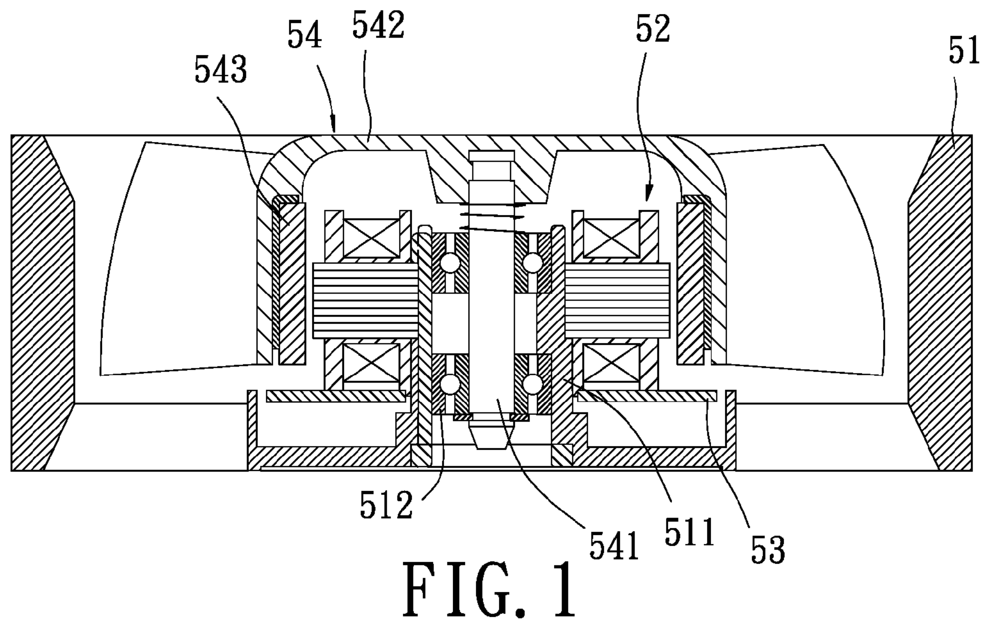
FIG. 1 shows a cross-sectional view of a conventional heat dissipating fan having an outer-rotor-type motor.
Figure 2:
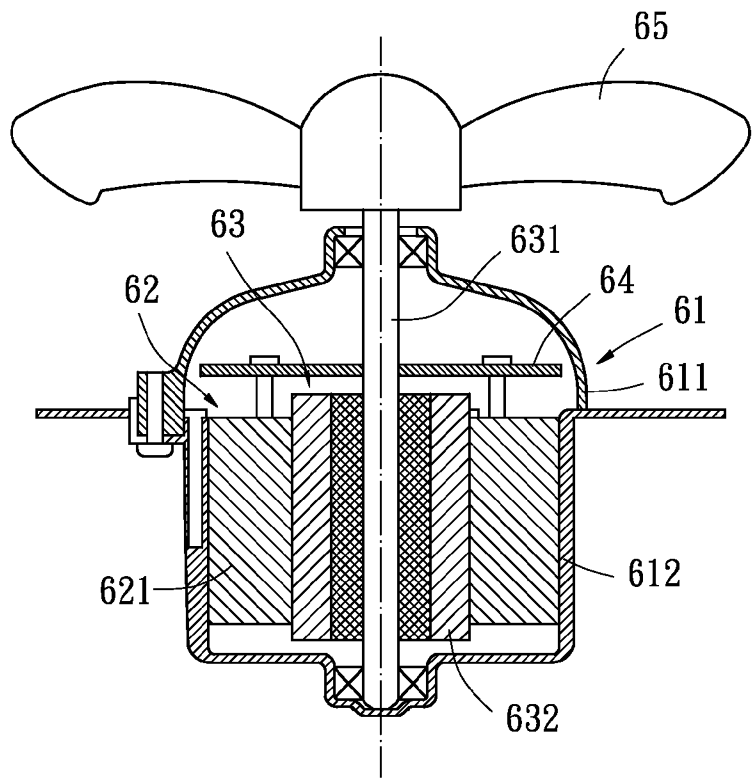
FIG. 2 shows a cross-sectional view of a conventional heat dissipating fan having an inner-rotor-type motor.
Figure 3:
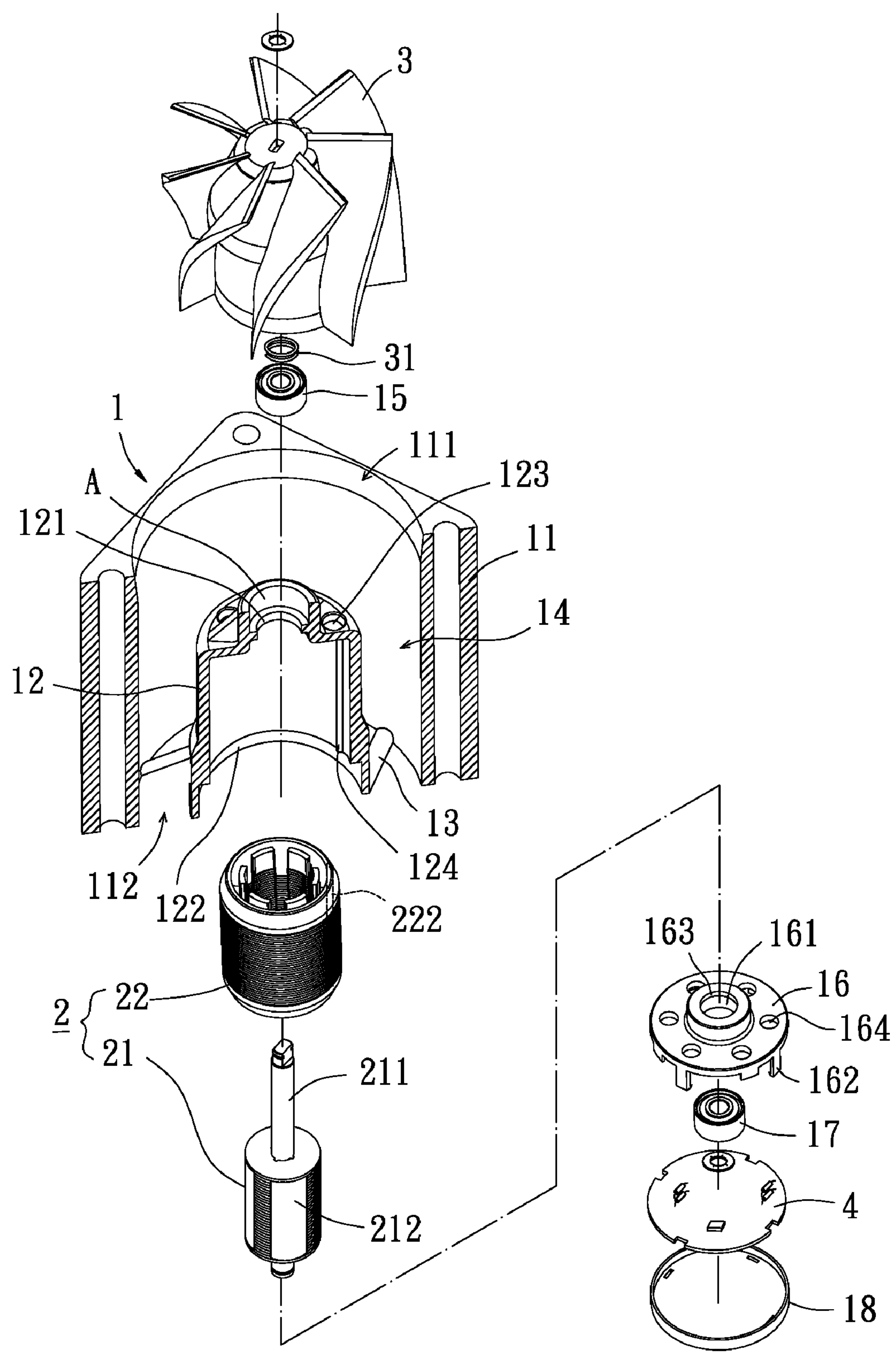
FIG. 3 shows an exploded perspective view of a heat dissipating fan of a first embodiment according to the preferred teachings of the present invention.
Figure 4:
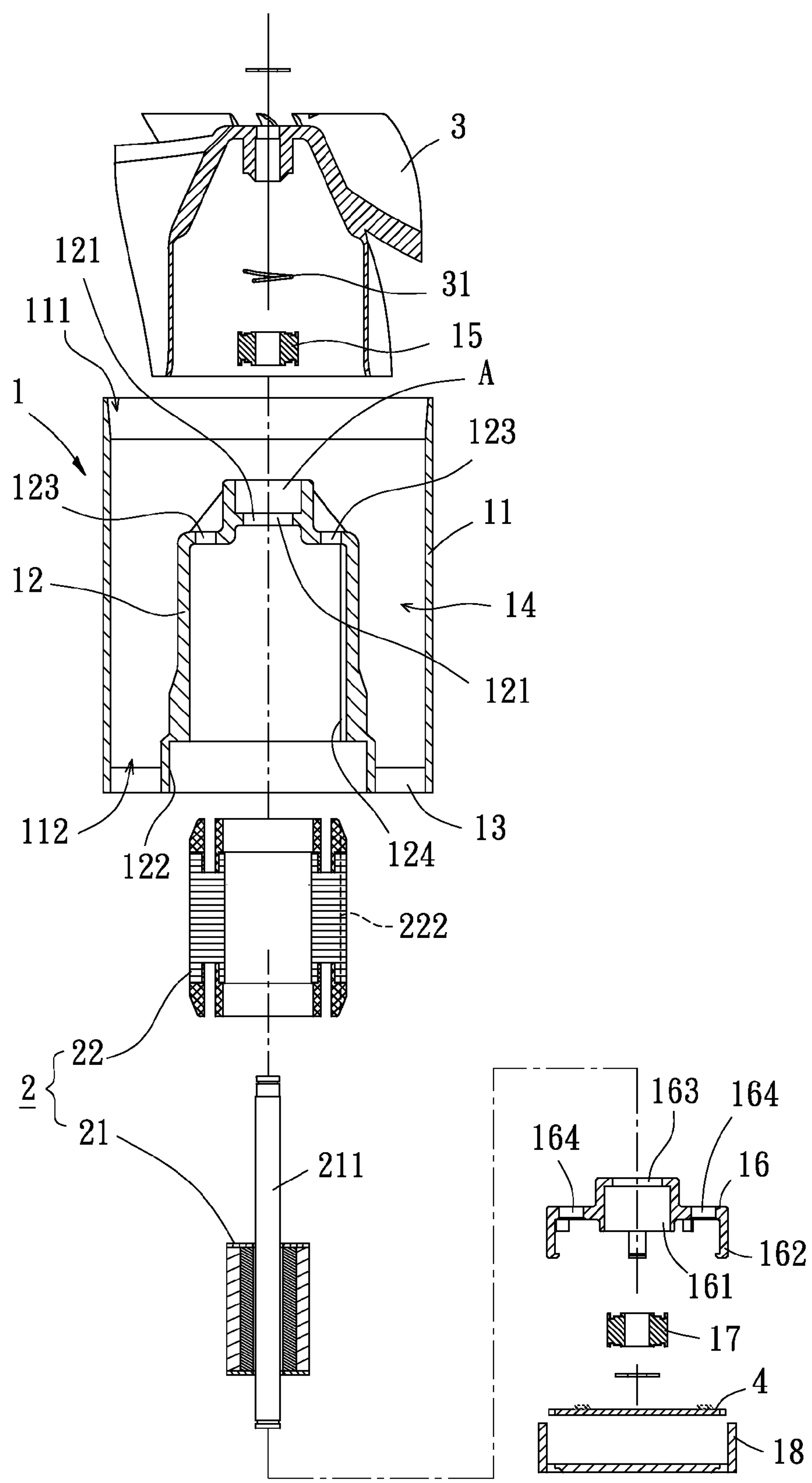
FIG. 4 shows an exploded cross-sectional view of the heat dissipating fan of FIG. 3.
Figure 5:
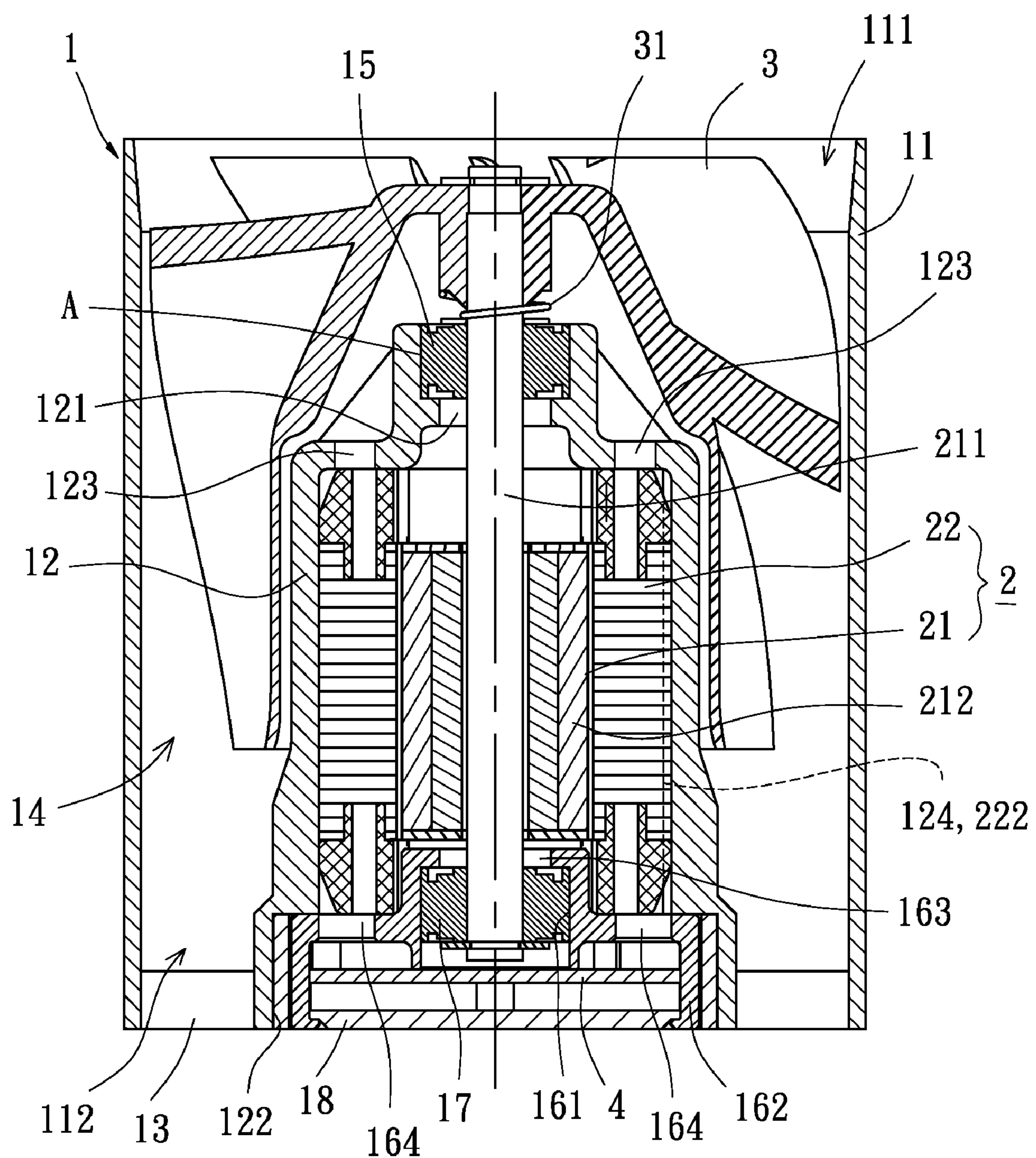
FIG. 5 shows a cross-sectional view of the heat dissipating fan of FIG. 3 in an assembled state.

FIGS. 3 through 5 show a heat dissipating fan of a first embodiment according to the preferred teachings of the present invention. According to the preferred form shown, the heat dissipating fan includes a fan housing 1, an inner-rotor-type motor 2, an impeller 3, and a circuit board 4. The fan housing 1 is an integrally formed housing in which the motor 2 is mounted. The impeller 3 is coupled with the motor 2. The circuit board 4 is electrically connected to the motor 2 to control the motor 2 for driving the impeller 3 to rotate.

According to the preferred form shown, the fan housing 1 includes an outer frame portion 11 having an air inlet 111 and an air outlet 112 respectively in two ends thereof. A hollow motor casing 12 is formed in and integral with the outer frame portion 11. Preferably, the motor casing 12 is connected to the outer frame portion 11 by at least one connecting member 13, defining a passageway 14 between the motor casing 12 and the outer frame portion 11. Preferably, the connecting member 13 is adjacent to the air outlet 112 of the outer frame portion 11 and can be in the form of a rib or fixed blade.

According to the preferred form shown, to assist in assembly of motor 2, the motor casing 12 includes a first opening 121 in an end thereof facing the air inlet 111 and a second opening 122 in the other end thereof facing the air outlet 112. An end of the motor casing 12 further includes a plurality of heat dissipating holes 123 in communication with an interior of the motor casing 12. A first positioning portion 124 is formed on an inner peripheral wall of the motor casing 12 and extends in an axial direction of the motor casing 12. The first positioning portion 124 is preferably in the form of a rib or groove for positioning the motor 2. Preferably, the first opening 121 of the motor casing 12 includes a chamber A for receiving a first bearing 15. Preferably, a positioning member 16 and an end cap 18 are removably mounted in the second opening 122. The positioning member 16 includes a compartment 161 in a central portion thereof for receiving a second bearing 17. A plurality of fixing portions 162 are formed on a side of the positioning member 16 and preferably in the form of hooks or other shapes for fixing the circuit board 4. The positioning member 16 further includes an axial through-hole 163 extending throughout the positioning member 16 and in communication with the compartment 161. Moreover, the positioning member 16 also includes a plurality of openings 164 surrounding the compartment 161. The openings 164 cooperate with the heat dissipating holes 123 for dissipating heat of the motor 2.

The motor 2 includes a rotor 21 and a stator 22 in which the rotor 21 is rotatably received. The rotor 21 includes a shaft 211 for the impeller 3 to mount on one end thereof and a magnetic element 212 fixed to an outer periphery of the shaft 211 and facing the stator 22. The stator 22 includes a second positioning portion 222 on an outer periphery thereof. Preferably, the second positioning portion 222 is in the form of a groove or rib for coupling with the first positioning portion 124 of the motor casing 12 to fix the motor 2 in the motor casing 12.

In assembly, the stator 22 of the motor 2 is mounted in the motor casing 12 of the fan housing 1, and the first bearing 15 is mounted in the chamber A of the first opening 121 of the motor casing 12. The shaft 211 of the motor 2 is extended through the stator 22 via the second opening 122 of the motor casing 12. Then, the shaft 211 is extended through the first opening 121 and rotatably held by the first bearing 15, with the magnetic element 212 in alignment with the stator 22.

The impeller 3 is coupled to an end of the shaft 211 that extends beyond the first opening 121. The impeller 3 is, thus, mounted in a position to align with the air inlet 111. A resilient element 31 is mounted between the impeller 3 and the first bearing 15 to allow stable rotation of the impeller 3. The positioning member 16 is engaged in the second opening 122 of the motor casing 12. The second bearing 17 is mounted in the compartment 161 of the positioning member 16. The other end of the shaft 211 is extended through the axial through-hole 163 and rotatably held by the second bearing 17. Thus, the shaft 211 can rotate in the motor casing 12 through use of the first and second bearings 15 and 17.

The circuit board 4 is fixed in place by the fixing portions 162 of the positioning member 16 and electrically connected to the stator 22. The circuit board 4 is fixed in a position spaced from the stator 22 by the positioning member 16 to prevent the heat dissipating effect of the circuit board 4 from being adversely affected by the large amount of heat resulting from operation of the stator 22. Finally, the end cap 18 is mounted to and, thus, seals the second opening 122 of the motor casing 12, preventing disengagement of the circuit board 4 and forming a heat dissipating fan having an inner-rotor-type motor 2.

With reference to FIG. 5, in use, the heat dissipating fan of the first embodiment according to the preferred teachings of the present invention can be mounted to any predetermined heat-generating portion of various electronic products, with the air outlet 112 toward the predetermined heat-generating portion. The circuit board 4 controls the stator 22 of the motor 2 and the magnetic element 212 of the rotor 21 to proceed with energizing for creating an alternating magnetic field so as to drive the shaft 211 of the rotor 21 and hence the impeller 3 to rotate. When the impeller 3 rotates, air current is guided into the passageway 14 via the air inlet 111 of the fan housing 1. The air current is concentrated in the passageway 14 and then guided out of the air outlet 112 to dissipate heat generated by the electronic products.

Figure 6:
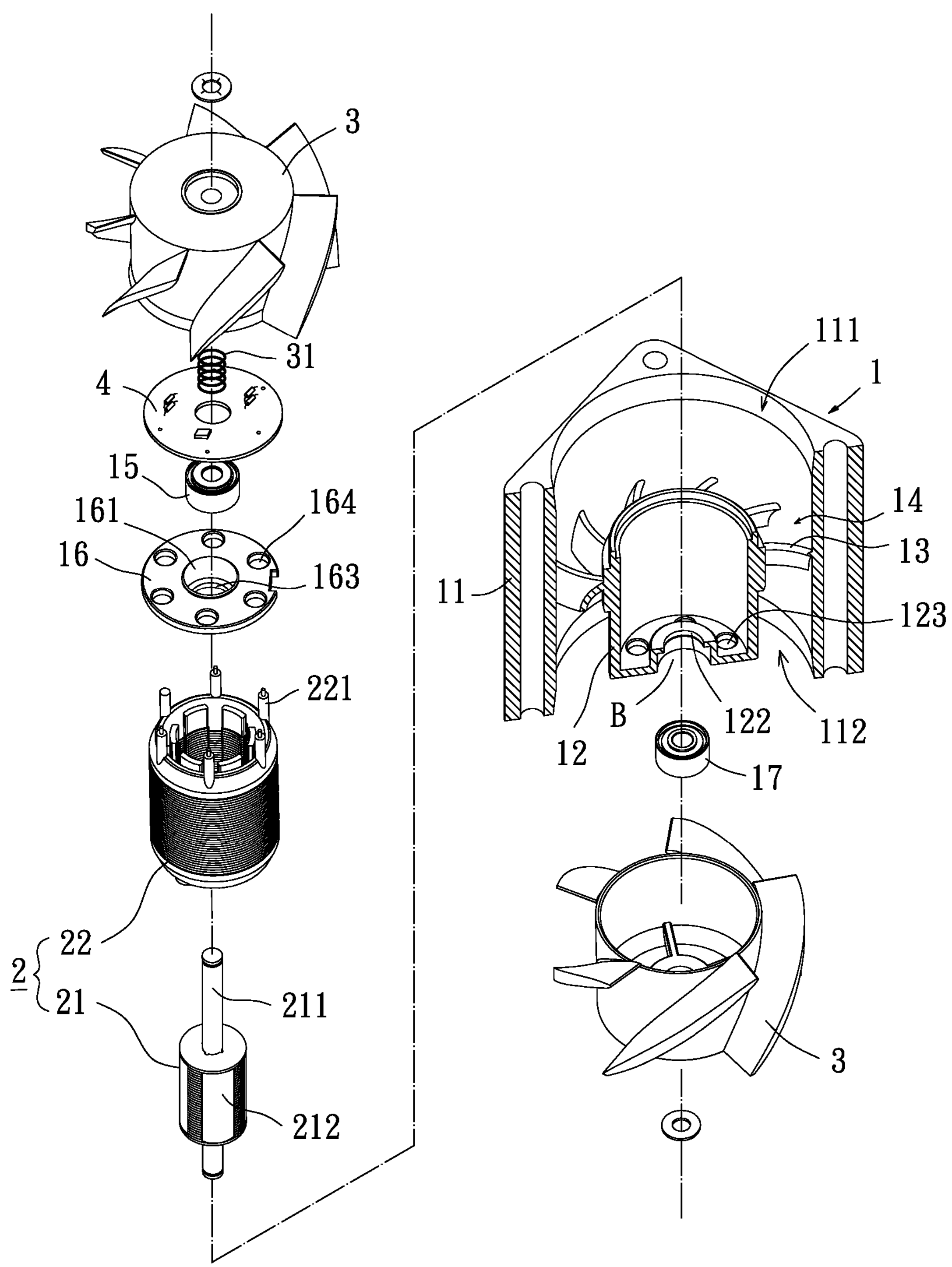
FIG. 6 shows an exploded perspective view of a heat dissipating fan of a second embodiment according to the preferred teachings of the present invention.
Figure 7:
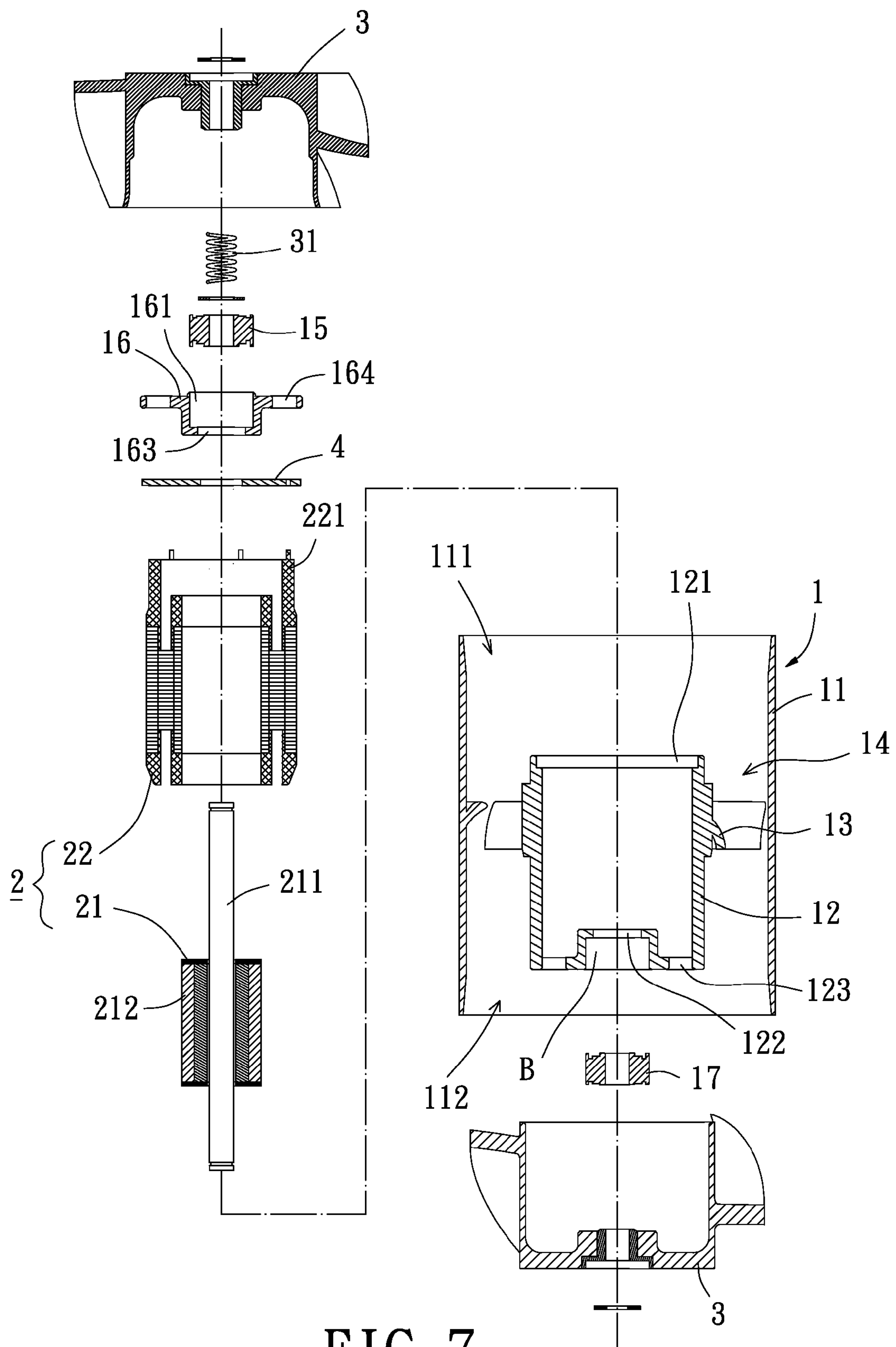
FIG. 7 shows an exploded cross-sectional view of the heat dissipating fan of FIG. 6.
Figure 8:
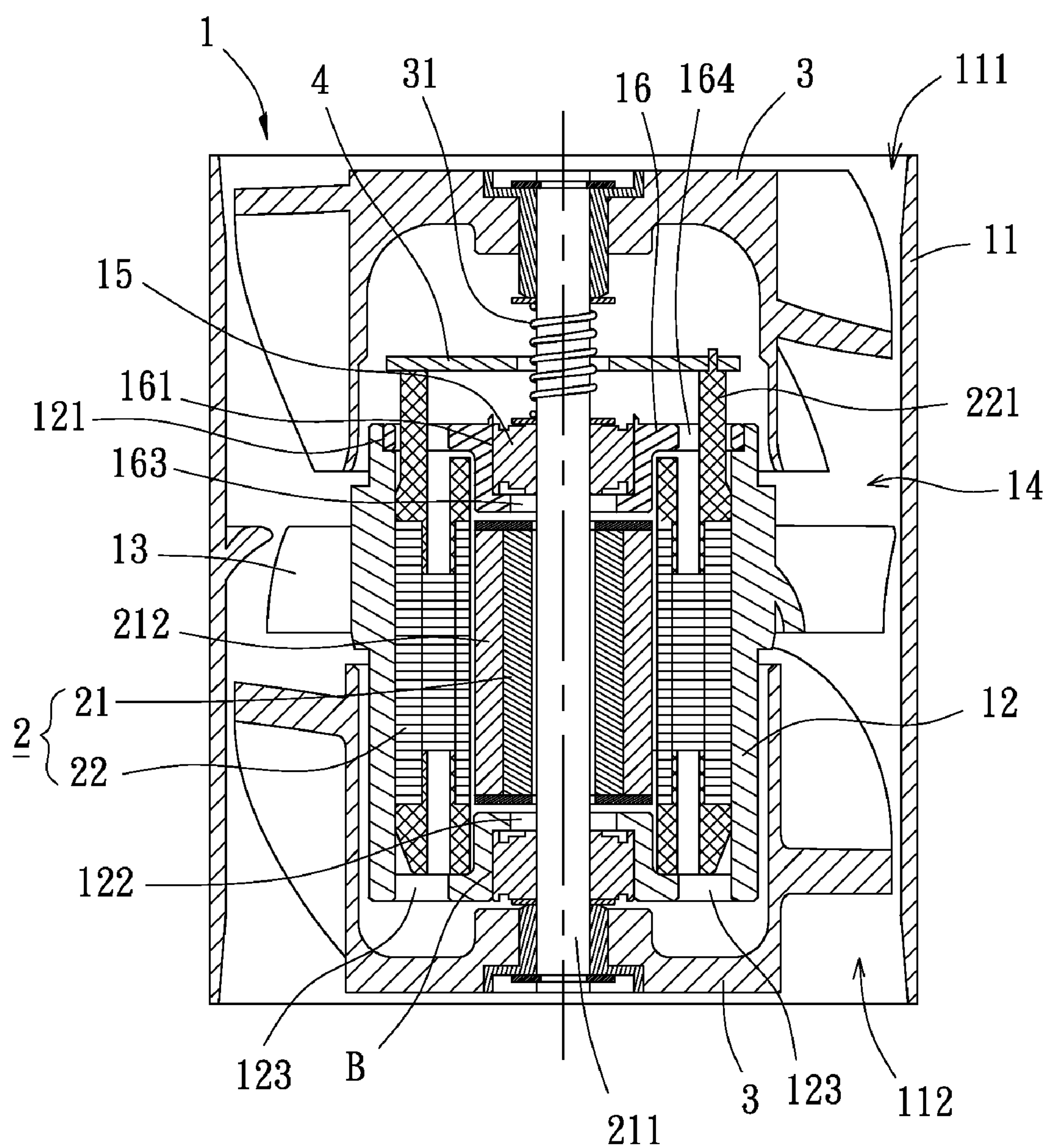
FIG. 8 shows a cross-sectional view of the heat dissipating fan of FIG. 6 in an assembled state.

FIGS. 6 through 8 illustrate a heat dissipating fan of a second embodiment according to the preferred teachings of the present invention. Compared to the first embodiment, the connecting member 13 of the fan housing 1 of the second embodiment is located between the air inlet 111 and the air outlet 112. The fixing portions 162 of the positioning member 16 are omitted. A plurality of positioning posts 221 are formed on an end of the stator 22. The second opening 122 of the motor casing 12 further includes a chamber B. Furthermore, two impellers 3 are respectively coupled to two ends of the shaft 211 of the rotor 21.

With reference to FIGS. 7 and 8, in assembly, the stator 22 of the motor 2 is mounted in the motor casing 12 of the fan housing 1. The second bearing 17 is mounted in the chamber B of the second opening 122 of the motor casing 12. The shaft 211 of the motor 2 is extended through the stator 22 via the first opening 121 of the motor casing 12, with an end of the shaft 211 extending through the second opening 122 and rotatably held by the second bearing 17, and with the magnetic element 212 facing the stator 22.

The positioning member 16 is engaged in the first opening 121 of the motor casing 12. The first bearing 15 is mounted in the compartment 161 of the positioning member 16. The other end of the shaft 211 is extended beyond the axial through-hole 163 and rotatably held by the first bearing 15. Thus, the shaft 211 can rotate in the motor casing 12 through use of the first and second bearings 15 and 17. The positioning posts 221 of the stator 22 are extended through the openings 164 of the positioning member 16 and, thus, exposed outside the motor casing 12. The circuit board 4 is, thus, directly fixed to the positioning posts 221. The circuit board 4 is electrically connected to the stator 22 and fixed in a position spaced from the stator 22 by the positioning member 16 to prevent the heat dissipating effect of the circuit board 4 from being adversely affected by the large amount of heat resulting from operation of the stator 22.

The impellers 3 are respectively mounted to the ends of the shaft 211 extending beyond the first and second openings 121 and 122 so that the impellers 3 are in alignment with the air inlet 111 and the air outlet 112 of the fan housing 1. The connecting member 13 is located between the impellers 3. A resilient element 31 is mounted between one of the impellers 3 and the first bearing 15 to allow stable rotation of the impeller 3 and to form a heat dissipating fan having an inner-rotor-type motor 2. The heating dissipating fan of the second embodiment according to the preferred teachings of the present invention utilizes the motor 2 to simultaneously rotate the impellers 3 to guide air current into the passageway 14 via the air inlet 111 of the fan housing 1. The air current is concentrated in the passageway 14 and then guided out of the air outlet 112 to dissipate heat generated by the electronic products.

As mentioned above, the heat dissipating fans according to the preferred teachings utilize inner-rotor-type motors 2 that are more stable in rotation than conventional heat dissipating fans utilizing outer-rotor-type motors. The rotor 21 and the impeller(s) 3 can rotate stably to enhance the overall heat dissipating effect of the heat dissipating fans. Furthermore, the heat dissipating fans according to the preferred teachings of the present invention provide more convenient assembly than conventional heat dissipating fans utilizing inner-rotor-type motors by utilizing a fan housing 1 having an integrally formed motor casing 12 so that the inner-rotor-type motor 2 can be conveniently mounted in the motor casing 12. Furthermore, the circuit board 4 and the stator 22 are spaced apart from each other by the positioning member 16 to prevent the heat dissipating effect of the circuit board 4 from being adversely affected by the large amount of heat resulting from operation of the stator 22. Thus, damage to the associated electronic elements can be avoided.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A heat dissipating fan comprising:

a fan housing including an outer frame portion having two ends, with an air inlet and an air outlet being respectively defined in the two ends of the outer frame portion, with a hollow motor casing being formed in and integral with the outer frame portion, with the hollow motor casing including first and second openings respectively in two ends thereof, with the first opening of the motor casing including a chamber;

an inner-rotor-type motor mounted in the motor casing and including a rotor and a stator, with the rotor being rotatably received in the stator and including a shaft and a magnetic element, with the shaft extending beyond the motor casing, with the magnetic element being coupled with the shaft and facing the stator;

at least one impeller coupled to the shaft and located outside the motor casing;

a circuit board electrically connected to the stator;

a positioning member mounted in the second opening, with the positioning member including a plurality of fixing portions fixing the circuit board, and with the circuit board and the stator being spaced from each other by the positioning member, with the positioning member including a compartment and a through-hole in communication with the compartment;

a first bearing received in the chamber; and a second bearing received in the compartment, with an end of the shaft being extended through the first opening and rotatably coupled with the first bearing, and with another end of the shaft being extended through the through-hole and rotatably coupled with the second bearing.

2. The heat dissipating fan as claimed in claim 1, with said at least one impeller including an impeller coupled to an end of the shaft extending beyond the first opening.

3. The heat dissipating fan as claimed in claim 1, with said at least one impeller including an impeller coupled to an end of the shaft extending beyond the first opening, with the heat dissipating fan further comprising, in combination: a resilient element mounted between the impeller and the first bearing.

4. The heat dissipating fan as claimed in claim 1, further comprising, in combination: at least one connecting member interconnected between the motor casing and the outer frame portion and defining a passageway between the motor casing and the outer frame portion.

5. The heat dissipating fan as claimed in claim 1, with the motor casing including a first positioning portion on an inner peripheral wall thereof, and with the stator including a second positioning portion coupled with the first positioning portion.

6. A heat dissipating fan comprising:

a fan housing including an outer frame portion having two ends, with an air inlet and an air outlet being respectively defined in the two ends of the outer frame portion, with a hollow motor casing being formed in and integral with the outer frame portion, with the motor casing including first and second openings respectively in two ends thereof, with the motor casing and the outer frame portion being interconnected by a plurality of fixed blades to define a passageway, with the first opening of the motor casing including a chamber;

an inner-rotor-type motor mounted in the motor casing and including a rotor and a stator, with the rotor being rotatably received in the stator and including a shaft and a magnetic element, with the shaft extending beyond the motor casing, with the magnetic element being coupled with the shaft and facing the stator;

at least one impeller coupled to the shaft and located outside the motor casing;

a circuit board electrically connected to the stator;

a positioning member mounted in the second opening, with the positioning member including a plurality of fixing portions fixing the circuit board, and with the circuit board and the stator being spaced from each other by the positioning member, with the positioning member including a compartment and a through-hole in communication with the compartment;

a first bearing received in the chamber; and a second bearing received in the compartment, with an end of the shaft being extended through the first opening and rotatably coupled with the first bearing, and with another end of the shaft being extended through the through-hole and rotatably coupled with the second bearing.

7. The heat dissipating fan as claimed in claim 6, with said at least one impeller including an impeller coupled to an end of the shaft extending beyond the first opening.

8. The heat dissipating fan as claimed in claim 6, with said at least one impeller including an impeller coupled to an end of the shaft extending beyond the first opening, with the heat dissipating fan further comprising, in combination: a resilient element mounted between the impeller and the first bearing.

9. The heat dissipating fan as claimed in claim 6, with the motor casing including a first positioning portion on an outer peripheral wall thereof, and with the stator including a second positioning portion coupled with the first positioning portion.

* * * * *